United States Patent [19]

Hisayasu et al.

[11] Patent Number: 4,771,545

[45] Date of Patent: Sep. 20, 1988

[54] PRECISION POINTING MECHANISM

[75] Inventors: Dennis M. Hisayasu, Granada Hills; Peter C. Fu, Monterey Park, both of Calif.

[73] Assignee: Hughes Aircraft Company, Los Angeles, Calif.

[21] Appl. No.: 813,363

[22] Filed: Dec. 24, 1985

[51] Int. Cl.⁴ ................................................ B26B 3/00
[52] U.S. Cl. ..................................... 33/299; 33/1 PT; 33/569; 33/268; 350/568
[58] Field of Search ............. 33/299, 237, 1 N, 1 PT, 33/1 SC, 568, 569, 570, 268; 350/543, 567, 568

[56] References Cited

U.S. PATENT DOCUMENTS

| | | | |
|---|---|---|---|
| 2,452,089 | 10/1948 | Wiken et al. | 33/569 |
| 2,574,110 | 11/1951 | Kopec | 33/570 |
| 2,999,939 | 9/1961 | Bible et al. | 33/268 |
| 3,015,249 | 1/1962 | Taylor | 33/268 |
| 4,541,294 | 9/1985 | Byers | 350/568 |

Primary Examiner—Willis Little
Attorney, Agent, or Firm—Lewis B. Sternfels; A. W. Karambelas

[57] ABSTRACT

A telescope (10) is precisely pointed by a detent mechanism (32) in a sighting direction (18) after a motor (22) generally positions the telescope. The detent mechanism includes a roller assembly (60) precisely journalled at one end of an arm (38) which is biased into contact with a precisely formed V-groove (36) on the telescope by a spring 72.

12 Claims, 3 Drawing Sheets

4,771,545

PRECISION POINTING MECHANISM

BACKGROUND OF THE INVENTION

This invention was made with Government support under Contract No. F33657-83-C-2134 awarded by the Department of the Air Force. The Government has certain rights in this invention.

1. Field of the Invention

The present invention relates to a precision pointing assembly and, in particular, to one for precise pointing in an optical sighting system.

2. Description of Related Art

Heretofore, precision pointing of optical sighting systems, e.g., telescopes, was complicated and expensive requiring the use of torquers, resolvers, and servo loops having very close tolerances. Such components are not only costly but also add weight and complexity, with attendant reliability problems. In addition, such systems are sometimes used in hostile environments and, most often, in field operations where repair depots may not be readily available. Thus, dependability along with simplicity are desirable co-existent conditions.

SUMMARY OF THE INVENTION

The present invention overcomes these and other problems in the prior art while meeting such conditions of reliability, dependability and simplicity by use of a preferred ball/roller and detent type of arrangement. One of the two is placed on an optical sighting and pointing arrangement which is movable to a desired pointing direction which is defined, for example, by the detent. When the detent is aligned with a roller during movement of the arrangement, the ball is urged in a low friction manner into engagement with the detent.

Several advantages are derived therefrom. Use of a ball or roller and detent comprises a low cost system which is simple and yet reliable. While still being highly accurate, the cost and complexity are reduced, and in a smaller package size with great weight savings.

Other aims and advantages as well as a more complete understanding of the present invention will appear from the following explanation of exemplary embodiments and the accompanying drawings thereof.

DETAILED DESCRIPTION OF THE INVENTION

Figure 1:
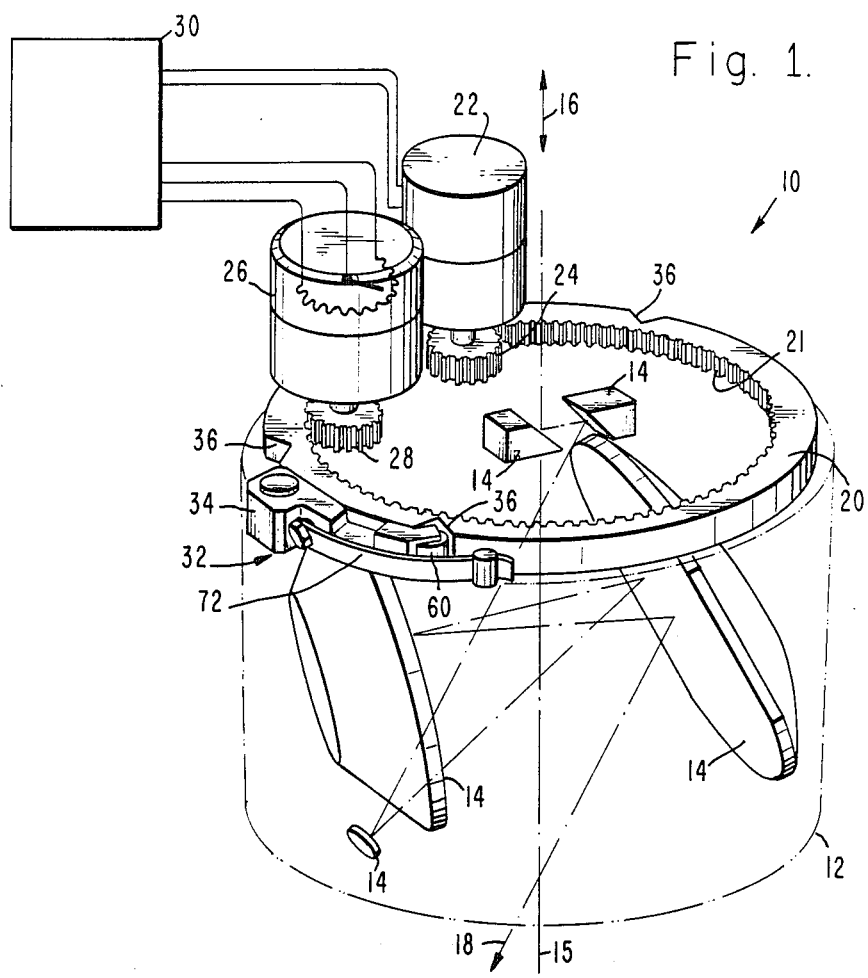
FIG. 1 is a perspective view of the present invention coupled to a telescopic sighting system.

As illustrated in FIG. 1, a telescope and drive mechanism assembly 10 includes a housing 12 placed about a plurality of optical elements, generally denoted by indicium 14, and rotatable about an axis 15. The optical elements are secured to and within housing 12 and direct electromagnetic energy between a source and a detector as denoted generally by double-headed arrow 16. The telescope has a pointing direction denoted by indicium 18.

Attached to housing 12 and centered on axis 15 is an annular gear 20 with internal gear teeth 21. A motor drive 22 is provided with a driving gear 24 which intermeshes with internal gear teeth 21 of internal gear 20. A potentiometer 26 is also coupled to internal gear teeth 21 through its gear 28. Position information of optical elements 14 and pointing direction 18 are effected through position sensing by means of potentiometer 26 coupled through gear motor 22 by sensing and driving electronics 30. The combination of gear motor 22, potentiometer 26 and electronics 30 therefore provides a general azimuth pointing of the telescope towards any desired scene.

To position the telescope in a precise pointing direction 18, a detent mechanism 32 is used. Mechanism 32 includes a detent arm assembly 34 and one or more detent V-grooves 36 placed on the external periphery of internal gear 20. Each of grooves 36 is precisely formed in the periphery of the internal gear and, therefore, precisely defines a pointing direction 18 for optical elements 14.

As shown in FIGS. 2-6, detent arm assembly 34 includes an arm 38 having a first end 40 pivoted to a fixed structure 42 about an axis 41; that is, it is fixed with respect to housing 12, optical elements 14 and internal gear 20.

Figure 4:
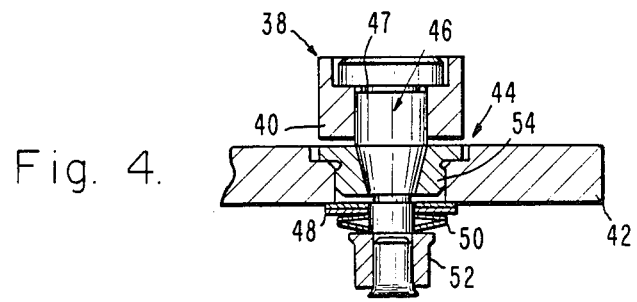
FIG. 4 is a cross-sectional view of the pivot for the detent arm assembly, taken along line 4—4 of FIG. 2.

As shown in FIG. 4, first arm end 40 is coupled to fixed structure 42 by a pivot assembly 44, which includes a post 46 centered on axis 41. Post 46 includes a shank 47 which passes through an opening in fixed arm end 40 and is coupled to the fixed structure by combination of a flat washer 48, spring washers 50, and a retaining lock nut 52. Precise journalling is ensured by a bushing 54 which, like post 46 and first arm end 40, are all precisely dimensioned to provide as precise and as friction free a journal as is possible.

Figure 5A:
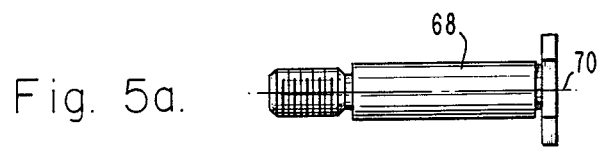
FIGS. 5a, and 5b are details of the roller assembly positioned at one end of the detent arm assembly illustrated in FIG. 2.
Figure 5B:
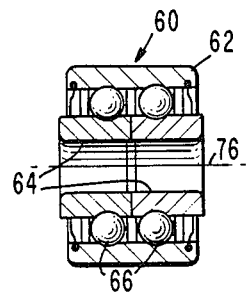

Arm 38 at its second end 56 (see FIG. 3) is bifurcated to provide parallel supports 58 into which a roller assembly 60 is journaled, as illustrated also in FIGS. 5a and 5b.

Roller assembly 60 includes an outer race 62, a pair of inner races 64 and ball bearings 66 therebetween which are constructed to form a preloaded bearing assembly. Inner races 64 are journalled on a shaft 68 which extends through fingers 58 of second arm end 56. The dimensioning of the construction is such as to provide an essentially friction free and uniform rolling of roller assembly 60 about its axis 70. In addition, axis 41 of first arm end 40 and axis 70 are preferably parallel to one another, as well as to axis 15 of telescope 10 and its housing and optical elements 14.

Figure 3:
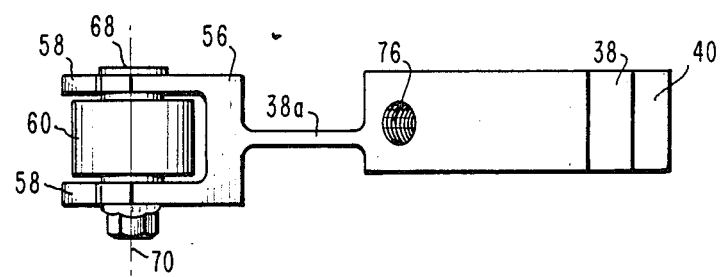
FIG. 3 is a view of the detent arm assembly shown in FIG. 2.
Figure 2:
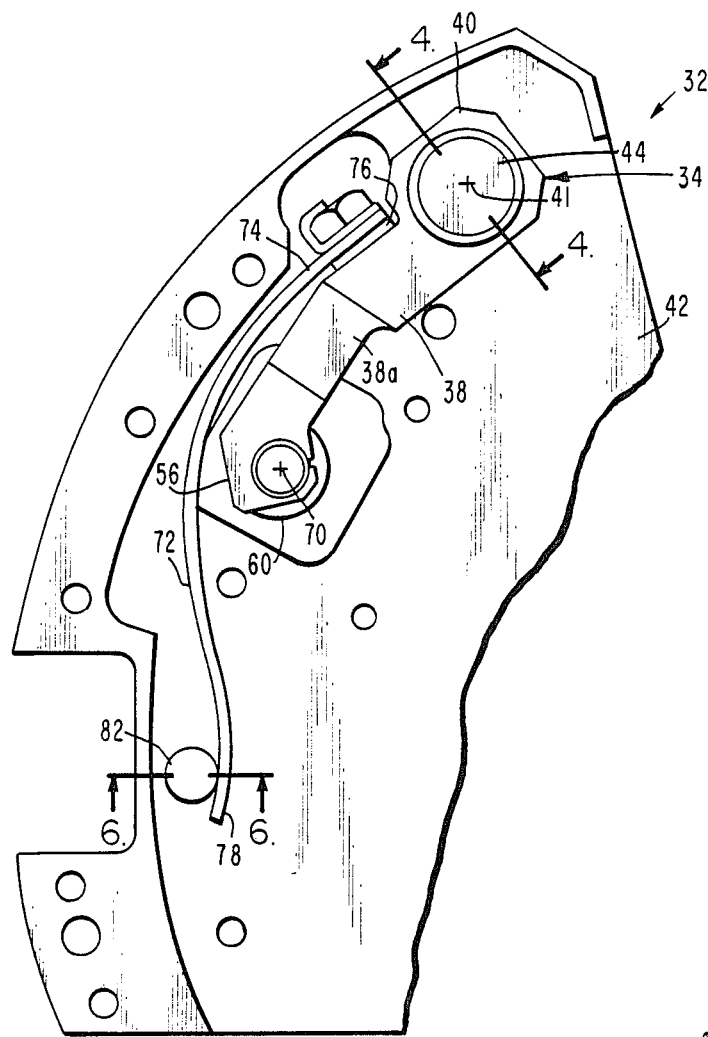
FIG. 2 is a representation of a detailed view of the drive-detent assembly, which is a portion of the arrangement shown in FIG. 1.
Figure 6:
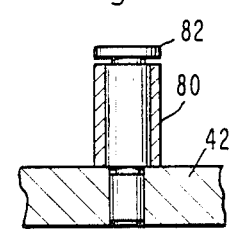
FIG. 6 is a view in partial cross-section taken along line 6—6 of FIG. 2 of a pin and sleeve with which the spring of FIG. 2 is in rolling contact.

In order to bias arm assembly 34 towards internal gear 20 and to insure a firm seating of outer race 62 of roller assembly 60 within grooves 36 on the periphery of the external gear when the roller and grooves are aligned, a deflection spring 72 (see FIGS. 1 and 2), configured as a stiff leaf of general S-shape, is secured at its first end 74 to a location 76 on arm 38 adjacent first arm end 40 and illustrated as including a screw within a threaded hole, shown in FIG. 3. Spring 72 bears at its second end 78 against a sleeve 80 (see FIGS. 2 and 6) which is journaled on a pin 82, pin 82 being affixed to fixed structure 42. The cooperative rolling action of sleeve 80 against a flat surface of end 78 of spring 72 is also designed to minimize friction as arm 38 and spring 72 move towards and away from internal gear 20 upon the latter's rotation.

To enable arm 38 to deflect in the event of any misalignment between axis 70 of roller assembly 60 and axis 15 of the telescope, as best shown in FIG. 3 arm 38 has a thin section 38a which permits slight bending movement of end 56 and the roller assembly with respect to first arm end 40.

In operation, gear motor 22 drives telescope 10 in a rotational manner about its axis 15 until it arrives at a specific pointing direction, such as denoted by arrow 18. Potentiometer 26 senses this direction according to a predetermined setting and stops the driving motion of the gear motor. At this point, roller assembly 60 is essentially aligned with a groove 36 so that, upon the bias of deflection leaf spring 72, the roller firmly engages the groove for precisely pointing optical elements 14 in the desired direction, as denoted by direction 18.

When it is desired to re-orient the optical elements in another pointing direction, gear motor 22 is again actuated and its design provides sufficient torque to overcome any friction and the force of spring 72 and the engagement of roller assembly 60 in groove 36. To this end, gear motor 22 adds a relatively high torque which may be provided by a permanent magnet direct current gear motor, as having relatively low cost, low weight and high torque output towards the required input power.

In a test, performance of this construction was demonstrated in pointing accuracy and repeatability and in a duty cycle to determine any signs of degradation due to wear over a sufficient number of detent cycles, e.g., 15,000 cycles. The duty cycle tests involved sequential movements from a third to a second to a first position and thence back to the second and third positions. The results demonstrated a pointing accuracy for the three positions of 0°, 120°, and 180° with a tolerance of ±0.003%. The pointing repeatability was within one half of the unit requirement.

Figure 7:
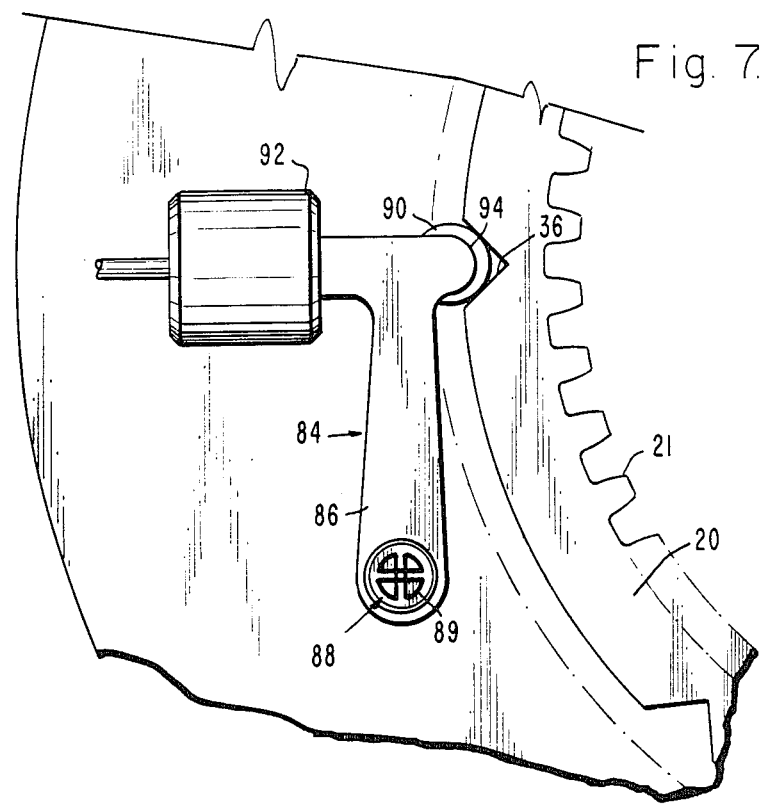
FIG. 7 is a view of a second embodiment of the present invention, specifically depicting an alternate drive-detent assembly.

Referring now to FIG. 7, the second embodiment of the present invention comprises an arm assembly 84 including an arm 86 pivoted at 88 by a resilient Bendix flectural pivot 89 to a fixed structure, such as fixed structure 42 of the prior embodiment. The resilient Bendix flexural pivot operates similarly to deflection leaf spring 72 of the prior embodiment, to ensure complete engagement between a roller assembly 94 and each of indentations or grooves 36. A detent roller assembly 90 of which roller assembly 94 is a part, is positioned at the second end of arm 86 and is further actuated by a solenoid 92 of conventional construction, which is used to withdraw detent roller assembly 90 from engagement with groove 36 and to decrease the amount of torque otherwise needed to be exerted by gear motor 22, especially when the slope of groove 36 is steep. The use of the linear solenoid permits a greater force by Bendix flectural pivot 89 or even, if desired, leaf spring 72, on roller assembly 94 in the V-groove. The combination of Bendix flexural pivot 89 or leaf spring 72 and linear solenoid 92 may be replaced by a bidirectionally operable linear solenoid. Roller assembly 94 is constructed similarly as roller assembly 60 of the first embodiment, and engages groove 36.

Although the invention has been described with reference to particular embodiments thereof, it should be realized that various changes and modifications may be made therein without departing from the spirit and scope of the invention.

What is claimed is:

1. In a drive mechanism for an optical sighting system, a precision pointing assembly comprising:
    an optical sighting and pointing arrangement;
    means for moving said arrangement to at least one pointing direction;
    means on and movable with said arrangement for precisely defining the direction;
    means stationary with respect to said precise direction defining means; and
    means having curved surfaces for coupling said precise direction defining means to said stationary means for precisely pointing said arrangement in the direction.

2. An assembly according to claim 1 in which said arrangement is rotatable about an axis, said precise direction defining means comprises a peripheral member having an indentation thereon, said coupling means includes a detent engageable in said indentation, and said movable means includes means for rotating said arrangement about its axis and said indentation into alignment and, consequently, into engagement with said detent.

3. In a drive mechanism for an optical sighting system, a precision pointing assembly comprising:
    an optical sighting and pointing arrangement rotatable about an axis to at least one pointing direction;
    a peripheral member having an indentation secured to and movable with said arrangement for precisely defining the direction;
    means stationary with respect to said peripheral member; and
    a detent including a roller precisely journalled about an axis and engageable in said indentation for coupling said peripheral member to said stationary means for precisely pointing said arrangement in the direction.

4. An assembly according to claim 3 in which said coupling means further comprises an arm assembly including an arm having first and second ends, said first arm end being pivotally secured to said stationary means and said detent being secured to said second arm end.

5. An assembly according to claim 4 in which said coupling means further includes means for urging said detent into engagement with said indentation upon the alignment therewith.

6. An assembly according to claim 5 in which said urging means comprises a Bendix flexural pivot, and further comprising a solenoid coupled to said detent for movement thereof in a linear direction towards and away from said indentation, said solenoid being operable to release engagement of said detent from said indentation.

7. An assembly according to claim 6 further including a spring-biased journalling device pivotally securing said first arm end to said stationary means.

8. An assembly according to claim 5 in which said coupling means further includes means for removing the engagement of said detent with said indentation.

9. An assembly according to claim 5 in which said urging means comprises a spring coupled between said detent and said stationary means for movement of said detent towards said indentation.

10. An assembly according to claim 9 in which said spring comprises a leaf coupled at one end to said stationary means and at a second end to said arm at a point thereon spaced from said first arm end.

11. An assembly according to claim 10 in which said stationary means further includes a pivot assembly having a rotatable bearing thereon and said second spring end includes a surface engageable in a rolling contact with said pivot assembly bearing.

12. An assembly according to claim 10 wheren said arm includes a center portion which is intermediate said first and second arm ends and which is reduced in thickness to provide a thin leaf section whose plane lies parallel to the axis of said pointing and sighting arrangment.

* * * * *